(12) United States Patent
Juse et al.

(10) Patent No.: US 12,031,881 B2
(45) Date of Patent: Jul. 9, 2024

(54) TEST STAND HAVING A BEARING HOUSING AND A BEARING UNIT

(71) Applicant: ZF Friedrichshafen AG, Friedrichshafen (DE)

(72) Inventors: Matthias Juse, Schardenberg (AT); Christian Hell, Untergriesbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 198 days.

(21) Appl. No.: 17/768,327

(22) PCT Filed: Oct. 29, 2020

(86) PCT No.: PCT/EP2020/080415
§ 371 (c)(1),
(2) Date: Apr. 12, 2022

(87) PCT Pub. No.: WO2021/084017
PCT Pub. Date: May 6, 2021

(65) Prior Publication Data
US 2023/0314279 A1    Oct. 5, 2023

(30) Foreign Application Priority Data
Oct. 30, 2019   (DE) .................... 10 2019 216 750.0

(51) Int. Cl.
*G01M 13/02*    (2019.01)
*F16C 35/04*    (2006.01)

(52) U.S. Cl.
CPC ........... *G01M 13/02* (2013.01); *F16C 35/042* (2013.01); *F16C 2370/00* (2013.01)

(58) Field of Classification Search
CPC ...... G01M 13/02; G01M 13/04; F16C 35/042
See application file for complete search history.

(56) References Cited

U.S. PATENT DOCUMENTS

| 2,670,253 A | 2/1954 | Scherler |
| 8,418,540 B2 | 4/2013 | Schrotter |
| (Continued) | | |

FOREIGN PATENT DOCUMENTS

| DE | 509315 | 10/1930 |
| DE | 871 856 | 3/1953 |
| (Continued) | | |

OTHER PUBLICATIONS

German Patent Office, Search Report issued in German Patent Application No. 10 2019 216 750.0 (Jun. 17, 2020).
(Continued)

*Primary Examiner* — Eric S. McCall
(74) *Attorney, Agent, or Firm* — Finch & Maloney PLLC

(57) ABSTRACT

A test stand includes a base frame and a bearing housing defining a frustoconical recess. A bearing unit has a bearing sleeve defining a through-going bearing bore coaxial with a rotation axis. A bearing shaft is rotatably mounted in the bearing bore. A contour of an outer conical wall of the bearing sleeve is at least partially identical with a contour of the frustoconical recess, where the bearing unit is detachably arranged in contact with the frustoconical recess. A fixing element on the distal end of the bearing shaft is configured for detachably fixing a test object. A test stand drive is arranged on the base frame and has a test shaft configured to be driven in rotation about the rotation axis, where the test shaft is configured to be connected coaxially to the bearing shaft of the bearing unit.

15 Claims, 3 Drawing Sheets

(56) References Cited

U.S. PATENT DOCUMENTS

| | | | |
|---|---|---|---|
| 9,506,840 B2* | 11/2016 | Wakazono | B29D 30/72 |
| 11,125,649 B2 | 9/2021 | Hell et al. | |
| 2013/0251295 A1* | 9/2013 | Gaisser | F04B 1/2014 |
| | | | 384/416 |
| 2014/0230534 A1* | 8/2014 | Tachibana | G01M 17/021 |
| | | | 73/146 |
| 2014/0373613 A1* | 12/2014 | Wakazono | G01M 17/022 |
| | | | 73/146 |
| 2015/0007644 A1* | 1/2015 | Wakazono | G01M 17/024 |
| | | | 73/146 |
| 2015/0027215 A1* | 1/2015 | Wakazono | G01M 17/02 |
| | | | 73/146 |
| 2016/0252431 A1* | 9/2016 | Tachibana | G01M 17/021 |
| | | | 73/146 |
| 2017/0363558 A1* | 12/2017 | Kost | G01M 17/022 |
| 2018/0328818 A1* | 11/2018 | Smith | G01M 17/022 |
| 2019/0204185 A1* | 7/2019 | Bösl | G01M 17/022 |
| 2019/0204186 A1* | 7/2019 | Eisenbeiss | G01M 17/022 |
| 2019/0359017 A1* | 11/2019 | Ueda | G01M 17/02 |
| 2019/0391043 A1* | 12/2019 | Hell | G01M 13/025 |
| 2021/0025784 A1* | 1/2021 | Matsumoto | B60C 25/002 |
| 2022/0026309 A1* | 1/2022 | Staudigel | G01M 13/04 |
| 2022/0026311 A1* | 1/2022 | Ito | G01M 17/02 |
| 2023/0213411 A1* | 7/2023 | Matsumoto | G01M 17/021 |
| | | | 73/146 |
| 2023/0304898 A1* | 9/2023 | Kayser | G01M 17/02 |
| 2023/0391032 A1* | 12/2023 | Dollinger | B29D 30/005 |
| 2024/0035929 A1* | 2/2024 | Dwolinski | G01M 17/021 |

FOREIGN PATENT DOCUMENTS

| | | |
|---|---|---|
| DE | 197 13 358 | 1/1998 |
| DE | 10 2010 025 807 | 2/2011 |
| DE | 10 2010 046 597 | 3/2012 |
| DE | 10 2010 017 456 | 1/2017 |
| DE | 10 2016 224 142 | 6/2018 |
| WO | 98/44260 | 10/1998 |

OTHER PUBLICATIONS

European Patent Office, International Search Report issued in PCT Patent Application No. PCT/EP2020/080415 (Feb. 15, 2021).

European Patent Office, Written Opinion issued in PCT Patent Application No. PCT/EP2020/080415 (Feb. 15, 2021).

* cited by examiner

TEST STAND HAVING A BEARING HOUSING AND A BEARING UNIT

RELATED APPLICATIONS

This application claims the benefit under 35 U.S.C. § 371 as a U.S. National Application of application no. PCT/EP2020/080415, filed on 29 Oct. 2020, which claims benefit of German Patent Application no. 10 2019 216 750.0 filed 30 Oct. 2019, the contents of which are herein incorporated by reference in their entireties.

FIELD OF THE DISCLOSURE

The invention relates to a test stand with a base frame, on which a test stand drive with a test shaft that can be driven in rotation about a rotation axis is arranged, such that the test shaft can be connected coaxially with a bearing shaft of a bearing unit mounted to rotate about the rotation axis, wherein the bearing unit is arranged releasably in a recess of a bearing housing connected fixed to the base frame, the said recess being coaxial with respect to the rotation axis, and at its end remote from the test stand drive and projecting out of the bearing housing, the bearing shaft has a fastening element for the releasable fixing of an object to be tested.

BACKGROUND

Such test stands are used, among other things, with the driven rotating test object to carry out acoustic, vibration, torque and function tests. Test objects can be for example electric motors and transmissions, in particular for electric drives of vehicles.

In these tests the bearing unit is subjected to high loads, so that it can rapidly undergo wear and have to be exchanged. Since the rotation axis of the test stand drive and the bearing shaft must be very accurately coaxial in order not to obtain any falsification of the measurement results, when the bearing unit is exchanged a time-consuming and elaborate fitting process for realignment of the test stand drive relative to the bearing shaft has to be carried out.

SUMMARY

Thus, the purpose of the present invention is to provide a test stand of the type mentioned at the start, whose bearing unit has a simple structure and can be fitted accurately in position.

According to the invention the objective is achieved in that the coaxial recess in the bearing housing is a recess with a truncated cone shape symmetrical relative to the rotation axis, in which recess a bearing sleeve of the bearing unit is arranged rotationally fixed and detachably, which sleeve has an outer cone wall which, since its outer contour is at least partially identical with the contour of the wall of the truncated cone-shaped recess, is in contact with the wall of the truncated cone-shaped recess, wherein the bearing sleeve has a through-going bearing bore coaxial relative to the rotation axis, in which bore one or more bearings of the bearing shaft is/are fitted.

The test stand drive is preferably an electric motor.

Thanks to the structure according to the invention, the bearing unit consisting of the bearing sleeve, the bearings and the bearing shaft is an assembly that can easily be put together in advance.

When it is installed with its outer conical wall in the truncated cone-shaped recess, this assembly can be inserted without play and with very high positional accuracy exactly coaxially with the rotation axis of the test stand drive, so that no further alignment is needed. This enables rapid replacement of the bearing unit.

The load transfer from the bearing shaft takes place in the area of the bearings via the bearing sleeve, directly into the bearing housing and the base frame.

If the end of the truncated cone-shaped recess with the smaller diameter faces toward the test stand drive, there is largely unimpeded access to the truncated cone-shaped recess.

The cone angle of the truncated cone-shaped recess can be between 10 and 5°. Preferably the cone angle is between 1' and 3°, in particular 2°. This ensures not only an exact coaxial alignment of the bearing unit but also good force transfer of the bearing forces into the bearing housing.

To ensure secure contact of the outer conical wall of the bearing sleeve against the truncated cone-shaped recess, the outer conical wall of the bearing sleeve can be configured with conical wall sections at the two end areas of the bearing sleeve, between which the bearing sleeve is made with a radially circumferential annular recess.

The bearing shaft can be mounted to rotate by way of roller bearings and/or slide bearings arranged in the two end areas of the bearing bore.

To absorb vibrations effectively during test operations and thereby largely avoid falsifications of the test data, the bearing sleeve and/or the base frame and/or the bearing housing can be made as vibration-damping components with high inherent damping.

In this case, the bearing housing is preferably made integrally, as one piece with the base frame.

The bearing housing can also be made as a compact component with large mass, in particular with a large wall thickness.

In order to be able to take the bearing unit off or fit it on quickly, the bearing sleeve can have at its end with larger diameter a radially circumferential annular shoulder, on the side of which facing away from the end of the bearing sleeve with the smaller diameter a securing element is axially in contact, which can be fixed detachably onto the bearing housing.

For that purpose, in a simple manner the securing element can be a clamping ring which is fitted into a coaxial annular groove of the bearing housing.

The fastening element of the bearing shaft that projects out of the bearing housing can be a fixing flange.

BRIEF DESCRIPTION OF THE DRAWINGS

An example embodiment of the invention is illustrated in the drawing and is described in greater detail below. The drawing shows.

DETAILED DESCRIPTION

Figure 1:
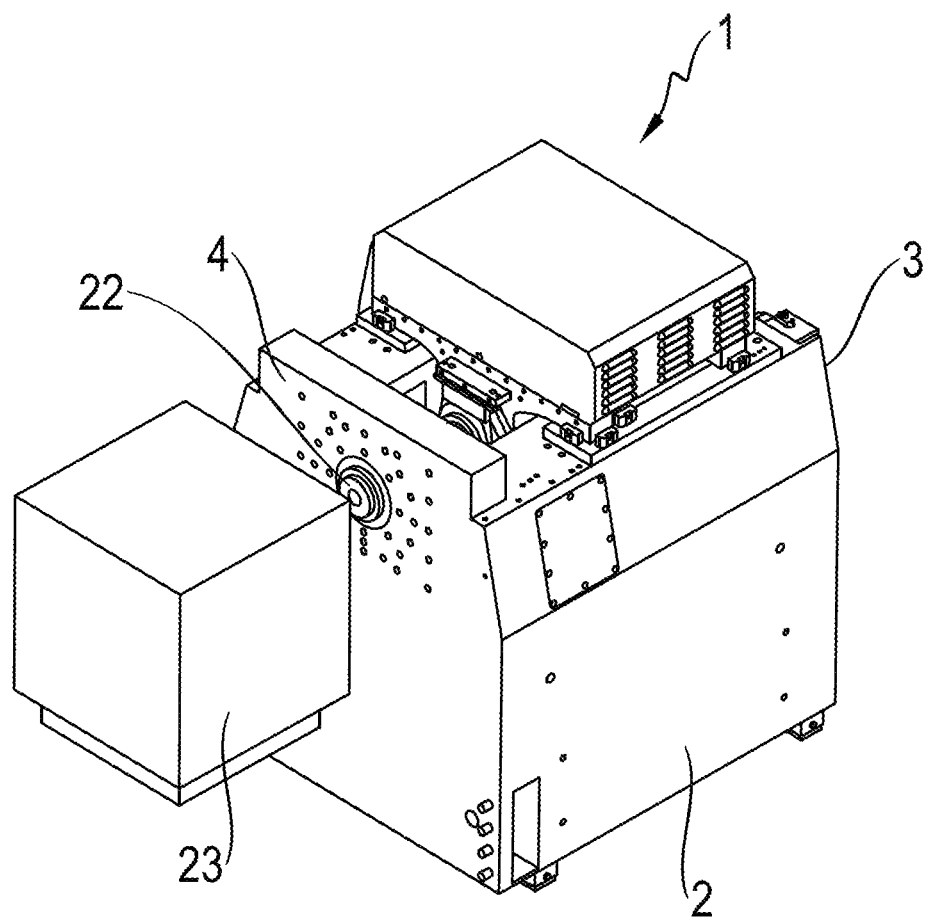
FIG. 1: A perspective representation of a test stand arrangement
Figure 2:
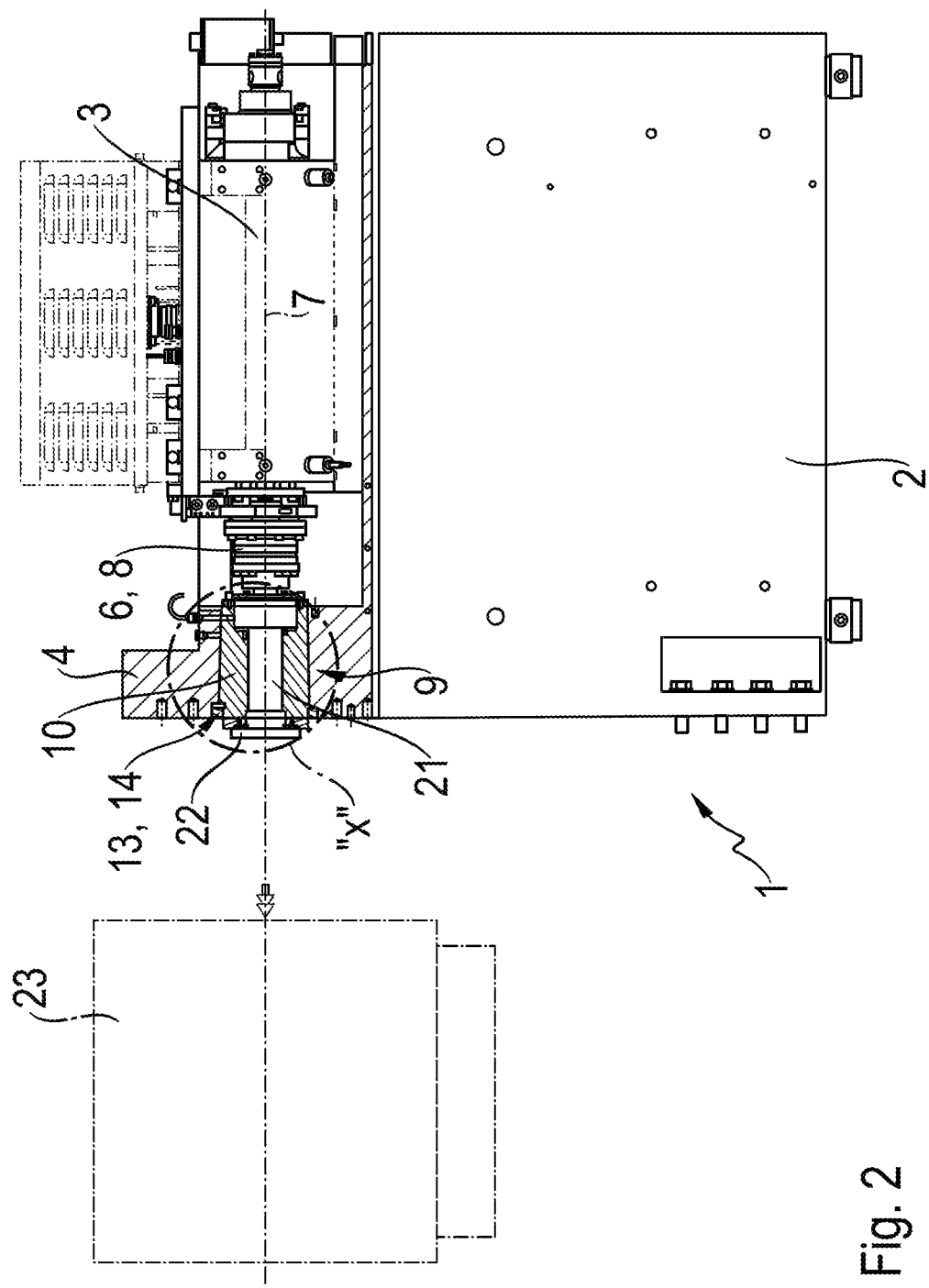
FIG. 2: A side view of the test stand arrangement shown in FIG. 1
Figure 3:
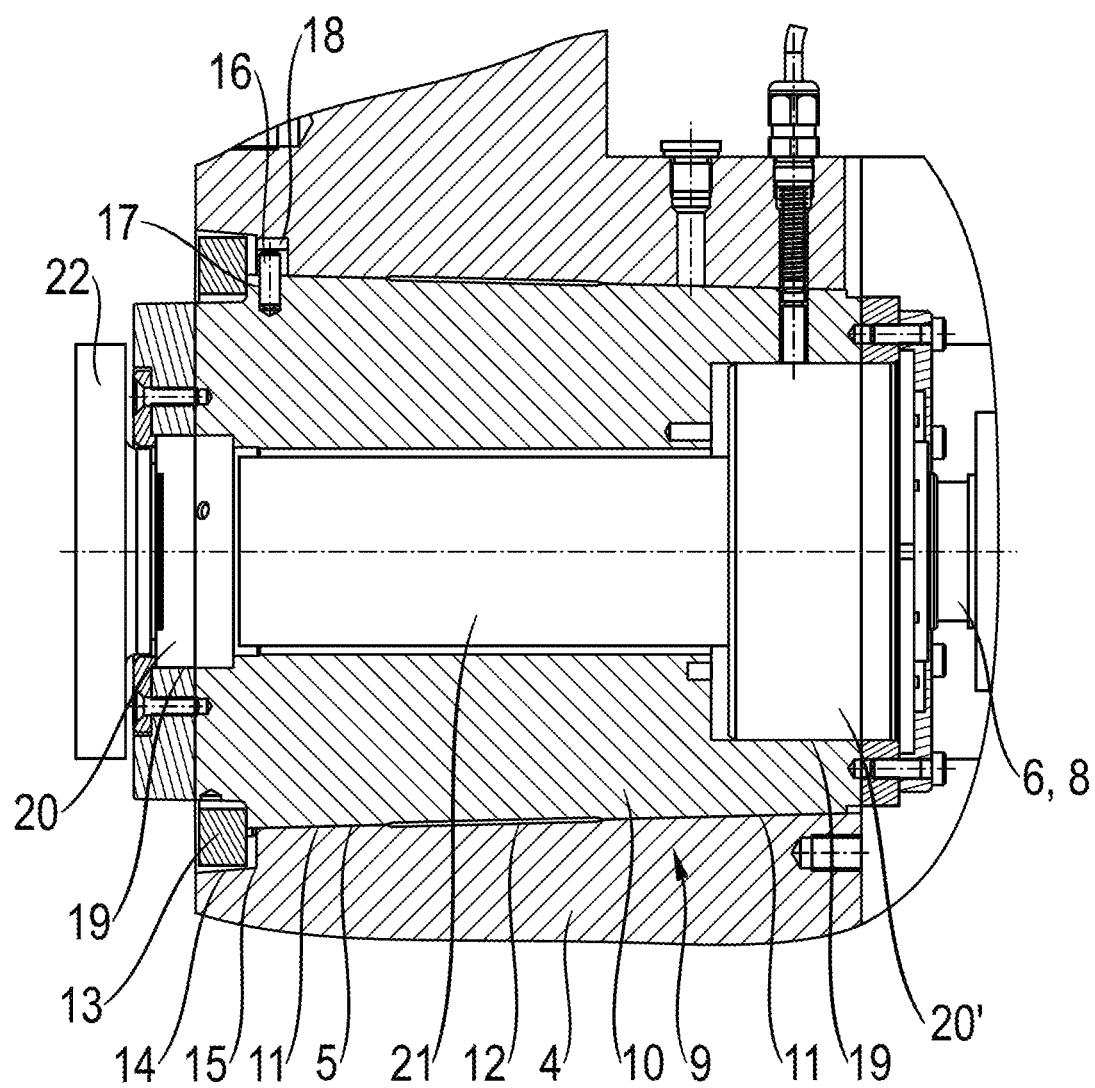
FIG. 3: An enlarged section "X" of the test stand of the test stand arrangement shown in FIG. 2.

The test stand arrangement according to FIGS. 1 and 2 shows a test stand 1 comprising a base frame 2 on which, as the test stand drive, an electric motor 3, and a bearing housing 4 are arranged.

The base frame 2 and the bearing housing 3 are made integrally as one piece and have vibration-damping properties. This can be achieved if the base frame 2 and the bearing housing 4 consist of a housing filled with concrete.

The electric motor 3 comprises a test shaft 6 that can be driven in rotation by the motor about a rotation axis 7, which is designed as a drive-train 8 coaxial with the rotation axis 7 that leads to the bearing housing 4, on which a torque-measuring device (not shown) as well as other measuring devices can be arranged.

The bearing housing 4 has a truncated cone-shaped recess 5 coaxial with and symmetrical relative to the rotation axis 7, with a cone angle of 2°, whose end with the smaller diameter faces toward the electric motor 3.

Into the truncated cone-shaped recess 5 is inserted a bearing sleeve 10 of a bearing unit 9, such that the bearing sleeve 10 has an outer conical wall that corresponds to the truncated cone-shaped recess 5. The outer conical wall of the bearing sleeve 10 is formed by conical wall regions 11 in the two end areas of the bearing sleeve 10. Between the two conical wall regions 11 an annular recess 12 is formed, so that the bearing sleeve 10 is in contact with the wall of the truncated cone-shaped recess 5 only with its conical wall regions 11.

According to another example embodiment not shown in the figures, no annular recess 12 is provided.

The bearing sleeve 10 is pushed into the cone-section-shaped recess 5 from the left side until its conical regions 11 make contact over 360° in the circumferential direction against the wall of the recess 5 and is secured by a clamping ring 13 in this assembled position. In this case the clamping ring 13 is set into an annular groove 14 of the bearing housing 4.

In this case a gap is left so that the ring 13 can press the bearing sleeve 10 snugly into the conical seat 11. The axial position of the bearing sleeve 10 is ensured by the precisely made cone diameter of the two components.

The bearing sleeve 10 is secured against twisting by a pin 16 inserted firmly into a corresponding radial bore 17 in the bearing sleeve 10, which pin projects radially outward therefrom into a slot 18 of the same width as the pin 16. The slot 18, which is formed in the bearing housing 4, is open toward the end side of the bearing housing 4 facing away from the electric motor 3.

The bearing sleeve 10 has a through-going bearing bore 19 coaxial with the rotation axis 7, in the axial end areas of which the outer races of roller bearings 20, 20' are set. The inner races of the roller bearings 20, 20' are arranged on a bearing shaft 21. Instead of roller bearings 20, 20' slide bearings 20, 20' could also be used.

At its end on the right, the bearing shaft 21 is connected detachably to the drive-train 8, whereas the left-hand end of the bearing shaft 21 that projects out of the bearing sleeve 10 is provided with a fixing flange 22.

In a receiving housing 23 a test object (not shown) which can be driven in rotation can be arranged. The test object can, for example, be an electric drive, in particular for a vehicle, or a transmission module. In such case, a shaft of the test object is connected to the fixing flange 22 coaxially with the rotation axis 7 in a rotationally fixed manner, and the receiving housing 23 is connected rotationally fixed to the bearing housing 4 (or alternatively, to a substructure [not shown] under the test object). The shaft of the test object can be connected directly, or indirectly by way of a clutch or a cardan shaft.

INDEXES

1 Test stand
2 Base frame
3 Electric motor
4 Bearing housing
5 Recess
6 Test shaft
7 Rotation axis
8 Drive-train
9 Bearing unit
10 Bearing sleeve
11 Conical wall region
12 Annular recess
13 Clamping ring
14 Annular groove
15 Annular shoulder
16 Pin
17 Radial bore
18 Slot
19 Bearing bore
20 Roller bearing or slide bearing
20' Roller bearing or slide bearing
21 Bearing shaft
22 Fixing flange
23 Receiving housing

The invention claimed is:

1. A test stand comprising:
a base frame;
a bearing housing fixedly attached to the base frame and defining a frustoconical recess;
a bearing unit comprising:
   a bearing sleeve defining a through-going bearing bore coaxial with a rotation axis, the bearing sleeve having an outer conical wall defining an outer contour that is at least partially identical with a contour of the frustoconical recess, wherein the bearing sleeve is arranged detachably and in a rotationally fixed manner in contact with the frustoconical recess;
   a bearing shaft mounted in the bearing bore and rotatable about the rotation axis by virtue of one or more bearings;
   a fixing element on a distal end of the bearing shaft and projecting out of the bearing housing, the fixing element configured for detachably fixing a test object, wherein the bearing unit is detachably arranged in the frustoconical recess of the bearing housing with the bearing shaft coaxial with the rotation axis; and
a test stand drive arranged on the base frame and having a test shaft configured to be driven in rotation about the rotation axis, wherein the test shaft is configured to be connected coaxially to the bearing shaft of the bearing unit.

2. Test stand according to claim 1, wherein the fixing element on the distal end of the bearing shaft is a fixing flange.

3. The test stand according to claim 1, wherein the distal end of the bearing shaft faces away from the test stand drive.

4. The test stand according to claim 3, wherein a proximal end of the frustoconical recess having a smaller diameter is positioned toward the test stand drive.

5. The test stand according to claim 1, wherein the outer conical wall of the bearing sleeve comprises conical wall regions at two end portions of the bearing sleeve, between which the bearing sleeve defines a radial recess that extends circumferentially all around the bearing sleeve.

6. The test stand according to claim 5, wherein the bearing shaft is mounted to rotate in the bearing bore by virtue of roller bearings and/or slide bearings in the two end portions of the bearing bore.

7. The test stand according to claim 1, wherein at least one of the bearing sleeve, the base frame, and/or the bearing housing is in the form of vibration-damping body having a high inherent damping.

8. The test stand according to claim 7, wherein the housing is at least partially filled with concrete.

9. The test stand according to claim 1, wherein a cone angle of the frustoconical recess is from 1° to 5°.

10. The test stand according to claim 9, wherein the cone angle is from 1° to 3°.

11. The test stand according to claim 10, wherein the cone angle is about 2°.

12. The test stand according to claim 1, wherein a distal end portion of the bearing sleeve projecting out of the bearing housing has a larger diameter, the distal end portion defining a radially extending shoulder that extends circumferentially all-round the distal end portion, the test stand further comprising a securing element in contact with a distal end of the shoulder that faces away from a proximal end of the bearing sleeve having a smaller diameter.

13. The test stand of claim 12, wherein the securing element is detachably fixed to the bearing housing.

14. Test stand according to claim 13, wherein the securing element is a clamping ring configured to be fitted into a coaxial annular groove defined in the bearing housing.

15. Test stand according to claim 14, wherein the fixing element on the distal end of the bearing shaft is a fixing flange.

* * * * *